United States Patent [19]

Scholl

[11] Patent Number: 4,647,268
[45] Date of Patent: Mar. 3, 1987

[54] PART HANDLING DEVICE

[75] Inventor: Herbert Scholl, Goppingen-Ursenwang, Fed. Rep. of Germany

[73] Assignee: EMAG Maschinenfabrik GmbH, Salach, Fed. Rep. of Germany

[21] Appl. No.: 757,512

[22] Filed: Jul. 19, 1985

Related U.S. Application Data

[63] Continuation-in-part of Ser. No. 485,643, Apr. 18, 1983, abandoned, which is a continuation of Ser. No. 849,662, Nov. 8, 1977, abandoned.

[30] Foreign Application Priority Data

Nov. 16, 1976 [DE] Fed. Rep. of Germany ....... 2652187

[51] Int. Cl.$^4$ ............................................. B66C 1/04
[52] U.S. Cl. .................................. 414/416; 294/65.5; 361/144; 414/122; 414/626; 414/618
[58] Field of Search ............... 414/122, 416, 626, 618, 414/744 C, 737; 294/65.5; 361/144

[56] References Cited

U.S. PATENT DOCUMENTS

| | | | |
|---|---|---|---|
| 3,350,609 | 10/1967 | Steele | 361/144 |
| 3,618,066 | 11/1971 | Brommont | 361/144 X |
| 3,780,884 | 12/1973 | Jones | 414/121 X |
| 3,783,344 | 1/1974 | Ono et al. | 361/144 |
| 4,166,649 | 9/1979 | Scholl | 294/65.5 |

FOREIGN PATENT DOCUMENTS 1295154  5/1969  Fed. Rep. of Germany .
 902207  8/1962  United Kingdom .

Primary Examiner—Frank E. Werner
Attorney, Agent, or Firm—Murray Schaffer

[57] ABSTRACT

A parts handling device is provided having a movable carrier on which is disposed a plurality of coil wound magnet poles. At least one of the poles is wound and with an A.C. source so that its current or voltage is subject to changes in response to induced magnetic flux caused by its proximity to a ferro-magnetic material. The changes in current or voltage so induced is sensed by a low impedance device or a resonant circuit device and an electric signal is produced which is employed to convert said poles to D.C. excitement control the operation of the parts handling device.

9 Claims, 3 Drawing Figures

PART HANDLING DEVICE

This is a continuation-in-part of copending U.S. patent application Ser. No. 485,643 filed Apr. 18, 1983, now abandoned which itself was a continuation of U.S. Ser. No. 849,662 filed Nov. 8, 1977, now abandoned.

BACKGROUND OF THE INVENTION

The present invention relates to a parts handling device with at least one holding magnet for holding a part or workpiece while being handled, said holding magnet having a coil by means of which a change of the magnetic field, due to the movement of a ferromagnetic part relative to the coil, can be sensed and utilized to initiate control functions.

A parts handling device comprising a non-magnetic belt conveyor and holding magnets disposed behind said belt conveyor and exerting a force on the parts or workpieces to be handled which presses them against the belt conveyor has been suggested heretofore. According to this prior suggestion, at least one of the holding magnets, which may be designed as permanent magnets or as D.C. or A.C. supplied electromagnets, is provided with a coil giving a signal in response to changes of the magnetic field which signal is used to control the path of the part being handled. The coil may be employed as a self-generating pick-up if the parts to be handled are magnetized, because a part passing the coil will then induce a voltage surge in the coil which can be utilized as control signals. As a rule, however, the coil is A.C. supplied and the change of the leakage or stray field of the coil, effected by the approach of a ferromagnetic (magnetized or not magnetized) part or workpiece, is utilized to form a control signal. The approach or withdrawal of a ferromagnetic part influences the inductance of the coil which can be measured, with the variation of the measured value providing the control signal, or which leads to a change of the passing current at constant supply voltage or a change of the coil voltage at constant supply current, said change of current or voltage serving as control signal. However, this principle of using a voltage surge induced in a coil or the inductance variation of a coil of a parts handling device upon approach or withdrawal of a ferromagnetic part for the generation of control signals is not limited to handling devices incorporating a belt conveyor, nor is the application of this principle restricted to controlling the path of the part to be handled.

It is an object of the present invention to expand the scope of the application of the aforementioned principle in connection with parts handling devices in order to impart certain advantageous properties to the parts handling devices so equipped.

SUMMARY OF THE INVENTION

According to the invention, this object is accomplished by an arrangement wherein the parts handling device comprises a magnet carrier plate which can be moved up and down by means of a hoisting apparatus for removing dumped or stacked ferromagnetic workpieces from a container and which is provided with a plurality of D-C excited holding magnets of which at least one is equipped with an A-C excited sensing coil connected to a control device which converts the signal generated by said coil into a control command effecting the sequential movement of the carrier and excitation of the holding magnets.

A special advantage of a parts handling device designed in accordance with this invention consists in that any risk of damage to the workpieces to be handled resulting from lowering the magnet carrier plate right down onto the workpieces can be dependably eliminated. In prior art parts handling devices with a lowerable magnet carrier plate for removing workpieces from containers (German Auslegeschrift No. 21 16 643) the holding magnets were movably supported in the magnet carrier plate. When the magnet carrier plate was lowered, the holding magnets first came to rest on the workpieces and were then moved slightly with respect to the magnet carrier plate upon further lowering of the latter. This slight movement was utilized for the actuation of mechanical switches. However, even this slight loading can be sufficient to damage and deform delicate parts which do not have a high mechanical load carrying capacity. If parts are dumped into a container, a few parts will generally be located at a slightly higher level than the rest. These parts will have to bear the full load all by themselves, which is no problem in the case of mechanically rugged parts but which is liable to result in damage if the parts are mechanically delicate. The same also applied to magnet carrier plates provided with proximity type switches or light barriers because proximity type switches, as well as light barriers can, in each case, only monitor very samll surface areas of the magnet carrier plate. In contrast, the arrangement of the present invention readily permits a coil to be associated with each of the holding magnets, thereby enabling virtually the entire surface of the magnet carrier plate to be monitored also with respect to the proximity of individual workpieces. Thus, the parts handling device of the present invention can also be employed where the prior art devices involved a risk of damage to, and failure of, the workpieces to be handled.

Apart from enabling delicate workpieces or parts to be handled with greater care, the arrangement of the present invention also enables the parts handling device to be operated at greater speed and with less energy. With the prior art devices, the supply current for the holding magnets was either switched on during the lowering movement of the magnet carrier plate or when one of the holding magnets had mechanically actuated the associated switch. The latter procedure reduces the number of work cycles of the device per unit time while the former leads to increased heating of the magnet carrier plate and higher energy requirements on the one hand and irregular attraction of the workpieces to the handled on the other hand, since these will "jump to meet" the approaching magnet carrier plate so excited. If, however, according to a preferred embodiment of the present invention, the current in the exciting windings of the holding magnets of the magnet carrier plate is controlled by the control device as a function of the signal generated by the sensing coil, excitation will not be turned on, or will not be increased, until the magnet carrier plate has come close enough to the workpieces to be picked up, either locally or entirely. Only then is the current switched on, either for the complete magnet carrier plate, if only one coil is provided, or to each of the holding magnets in response to the signal from the associated coil, if each holding magnet is provided with a separate coil. The last-mentioned embodiment, therefore, enables even dumped, irregularly arranged parts to be attracted gently and in a controlled fashion because only that magnet is switched on, in each case, which has approached one of the workpieces to be picked up with sufficient proximity.

Control as a function of the signal generated by the coil enables the current in the exciting windings of the holding magnets to be switched on and off, i.e. changed from the one extreme value to the other extreme value, but it may also be switched to intermediate values or from an intermediate value to one of the extreme values. Such switching in steps may be advantageous.

According to the invention, the downward movement of the magnet carrier plate is switched off by the control device as a function of the signal generated by the sensing coil. What can be achieved thereby is that damage owing to the load of a heavy magnet or even the complete magnet carrier plate resting on the parts is avoided even in the case of very delicate parts. In addition, the upward movement of the magnet carrier plate following upon the downward movement may also be switched on by the control device as a function of the signal generated by the sensing coil. Moreover, the control device may incorporate a switching element which delays the output control command or output current with respect to the input signals from the sensing coil or coils. There may also be provided both delayed and undelayed control command outputs, in which case the undelayed control signal output preferably controls the end of the downward movement of the magnet carrier plate, while the delayed control command initiates the upward movement. This affords certain advantages as compared with embodiments which are abruptly switched over from the downward to the upward movement by one and the same control command because sudden reversal of the direction of movement with the risk of workpieces which are not attracted very firmly dropping off is avoided thereby.

According to preferred embodiment of the invention, however, the sensing coil is A.C. supplied and the change in the current flowing through the coil with constant voltage or the change in coil voltage with constant current is then the control signal. This means that the variation of inductance causes a corresponding fixed change of the current flowing through the sensing coil or the coil voltage (or both, if a voltage source with finite internal resistance or a current source with an internal resistance other than zero is used to supply the coil).

According to still another embodiment of the invention, a capacitor is provided which forms a resonant circuit with the coil, which with the tuning of the circuit forms the control signal. The arrangement may be such that the resonant frequency is determined and that the resonant frequency itself is a signal which indicates whether a ferromagnetic object is sufficiently close or not, or else, especially if the coil simultaneously constitutes the exciting winding or part of the exciting winding, the arrangement may be out of tune when no ferromagnetic object is near and in tune when a ferromagnetic object is in contact, or almost in contact, with the magnet, or vice versa. An arrangement wherein the resonant circuit is in tune when the workpiece is attracted has the advantage of holding the workpiece very securely. However, the quality of the circuit must not be too high in this case, because otherwise differences in the contact between workpiece and magnet and resultant minor fluctuations of the resonant frequency may lead to differences in holding action.

The control device incorporates an undercurrent relay for converting the control signal of the coil into a control command. Such undercurrent relays are commercially available and enable the decrease in the supply current with a predetermined supply voltage owing to the increase of inductance to be converted into a control command without additional expenditure. These undercurrent relays are very dependable in operation and the control command can be generated directly by means of switching contacts of the undercurrent relay.

Further details and embodiments of the present invention will become apparent from the following description of embodiments of this invention shown by way of example and represented in a drastically schematized and simplified form in the accompanying drawing, in conjunction with the claims.

Figure 1:
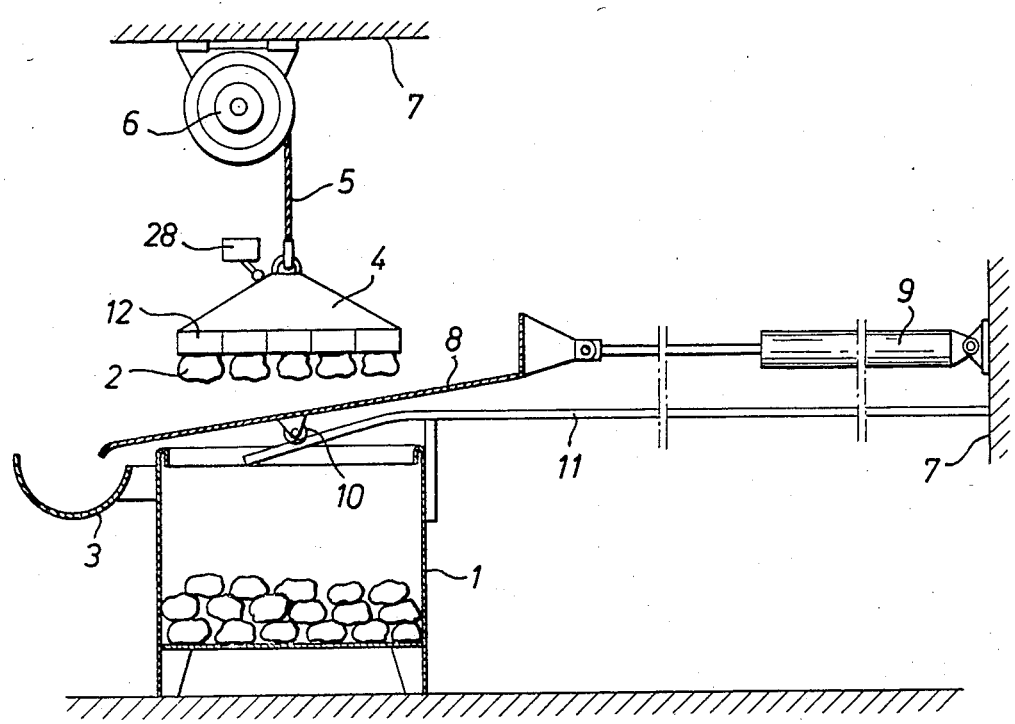
FIG. 1 shows schematically the apparatus for removing workpieces from a container embodying the present invention.

DESCRIPTION OF THE INVENTION:

As seen in FIG. 1, the apparatus comprises a container 1, to which workpieces 2 are delivered, in a dumped or stacked condition, which workpieces are to be conveyed individually to a processing station (not shown) via a chute 3. For this purpose, a magnet carrier plate 4 is pivotally suspended from a tension member 5 of a hoisting apparatus 6 mounted on a frame or supporting structure 7 (not shown in detail), to which are also secured further components of the device, which is a portable unit, although this is not apparent from the schematized representation in FIG. 1.

A chute or rocker 8 can be moved under the magnet carrier plate 4 by means of a ram 9. The ram 9 is pivoted to the supporting structure 7 at one end and the rocker 8 at the other end. On each of its lower side, the rocker 8 is provided with a roller 10, each roller running on one of two rails 11 disposed on both sides. The rail 11 is bent off in a downward direction in order to enable the rocker 8 to be swiveled about the pivot point of the ram 9 so that the workpieces 2 can successively slide into the chute 3 after they have been released by the magnet carrier plate 4 and dropped onto the rocker 8. The rocker 8 can additionally be provided with a vibration generating device or a pulsating pressure can be applied to the ram 9 so that the rocker 8 performs shaking movements which cause the workpieces 2 to slide into the chute 3 at a uniform rate.

Figure 2:
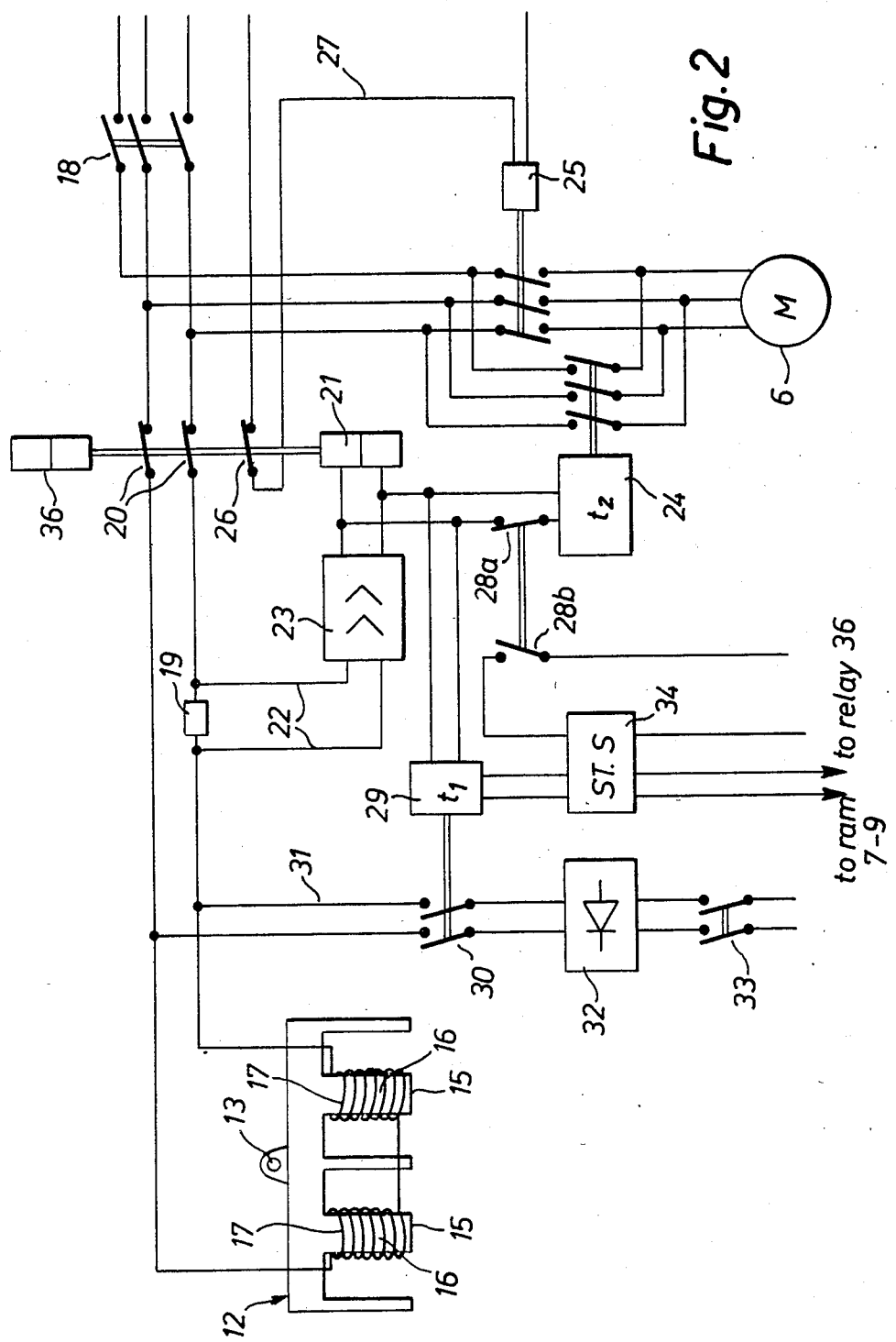
FIG. 2 is an electric circuit diagram for the sensing coils, holding magnets and the associated control device employing an induction signal producer.

As seen in FIG. 2, the magnet carrier plate 4 comprises a number of electromagnets 12 (of which only two are shown) which are rigidly or movably held in the magnet carrier plate 4, e.g. swivably suspended in the magnet carrier plate 4 by means of a lug 13. The electromagnets 12 are designed as D-C magnets. Their cores 14 consist of laminated transformer sheet or ferrite material and may, for example, take the form of cup cores. The poles 15 at the open end of the core 14, which projects downward from the magnet carrier plate 4, are the faces of legs 16 about which windings 17 are coiled. The windings 17 of the magnets 12 are connected to each other with one end each.

The free ends of the two outer windings of the legs 16 are run directly to a manually operable main switch 18 which provides a switchable connection to two phases of a three-phase A.C. supply system (not shown) in the usual manner. A low impedance precision resistor 19 is located in series in one of the lines leading to the windings and is constantly excited once the switch 18 is closed.

The lines from the windings 17 to the main switch 18 incorporate two normally closed (break) contacts 20 of a relay 21 so that normally excitation of the windings is maintained except when switch 18 is opened. A voltage proportional to the current flowing through the winding 17 is tapped at the precision resistor 19 and, via measuring lines 22, fed to an amplifier 23 whose output voltage is applied simultaneously to activate the relay 21, and to a pair of adjustable time switch 24 and 29 respectively.

The motor 6 of the hoisting apparatus is also connected to the supply system after the main switch 18 but in a three phase system. To provide for reversal of the motor the connection is made via a first three-pole contact bank of a manually operable control switch 25 and a second three-pole contact bank of the time switch 24.

In the activated condition of the relay 21, the contacts 20 are reversed and made into open condition and the windings 17 are thus disconnected from the main switch 18. In addition to the break contacts 20, the relay 21 is provided with a third break contact 26 which has connected to it a control line 27 which feeds control current to the control relay switch 25. If the contacts of the control relay switch 25 are closed and the relay 26 is also closed, the magnet carrier plate 4 moves downward. If, conversely, the contact 26 is open the motor stops until the contacts of the time switch 24 are closed. The time switch 29 which is activated by the control signal from the amplifier 23, acts to close normally open switch contacts 30 in a pair of leads 31 respectively leading from a voltage rectifier 32 providing D.C. current to the windings 17. The voltage rectifier is supplied from the electrical source via a manually operable control switch 33. Thus, simultaneous with stopping the motor 6 after the descent and prior to elevation of the carrier 2 the windings 17 are switched from A.C. to D.C. operation thereby exciting the holding magnets to attract the workpieces. Thereafter, on closing of the time switch 24 the motor of the hoisting apparatus 6 is reversed and the magnet carrier plate moves upward until, approximately in the position shown in FIG. 1 it touches a limit switch 28 comprising a normally closed break contact 28a and a normally open valve contact 28b.

On reaching the limit switch 28 the contact 28a opens and interrupts the line to the time switch 24, causing its three-pole contact bank to open instantly again stopping the motor 6. The limit switch 28 furthers closes the normally open contact 28b activating a stepping switch 34 which sequentially provides pulse signals, (a) to activate the ram 9 to place the rocker 8 beneath the carrier 2; (b) to thereafter reverse the position of the timing switch 29 to open the contacts 30 thereby disconnect the D.C. excitation allowing the work pieces to fall on the rocker 8; (c) to therefter reverse the cam 9 withdrawing the rocker and lastly (d) to activate a relay 36, the armature of which is connected to the contacts 20 and 26. The relay 36 operates in the opposite direction to that of the relay 21 to reset the contacts 20 and 26 to their normally closed positions. Upon this sequence of steps the motor 6 may again descend, repeating the automatic cycle of operation. Upon release of the limit switch 28 contact 28a closes and contact 28b opens.

To initiate the work cycle the main switch 18 is initially closed, the control relay switch 25 is switched on and the switch 33 to the voltage regulator is closed all by means of a hand or foot operated button or buttoms (not shown). Since the break contact 26 is closed, once the switch 18 is closed, A.C. current is applied to the windings 17, and to the motor 6 causing the motor to move the magnet carrier 4 downwardly. At this stage, the rocker 8 is, of course, retracted so that the magnet carrier plate 4 can move down into the container 1. As soon as one of the magnets 12 has come sufficiently close to one of the workpieces 2 in the container 1, the inductance in the winding 17 increases while the alternating current flowing through the said winding decreases, resulting in a decrease of the voltage across the precision resistor 19. This drop in voltage is sensed at the input of the amplifier 23. This voltage reduction at the input of the amplifier 23 produces an output signal which causes the relay 21 to be actuated and the clocks of the time switches 24 and 29 to start running down.

When the relay 21 is actuated the break contacts 20 open and current from the power source through the main switch 18 is interrupted. Concurrently with the opening of the break contacts 20, the break contact 26 is opened and the control relay switch 25 thereby switched off, causing its three-pole contact bank to open, cutting off power from the source to the motor 6 and thus terminating the downward movement of the magnet carrier plate 4. Almost simultaneously, however, closing of switch 30 allows D.C. current from the voltage regulator to pass into the windings 17. The holding magnets 12 are thus fully excited and dependably attract the workpieces 2 located directly in front of it, or already clinging to it. At the end of a predetermined time interval set (adjustably) by the time switch 24, the latter closes its three pole bank reinstituting power from the source to the motor causing the motor 6 of the hoisting apparatus to start rotating in the opposite direction, lifting the magnet carrier 4 to which the workpieces are firmly attracted.

When the magnet carrier 4 reaches the final position shown in FIG. 1, it activates the limit switch 28 opening the break contact 28a, which switches off the time switch 24, thereby also stopping elevation of the carrier by stopping the motor of the hoisting apparatus. Simultaneously, the limit switch 28 closes the normally open contact 28b which sets into operation the stepping switch 34 causing the sequential movement of the rocker 8; the release of D.C. excitation permitting of the workpieces to subsequently fall onto conveyor 3; the retraction of the rocker, and finally the resetting of contacts 20 and 26, so that the apparatus automatically recycles.

Figure 3:
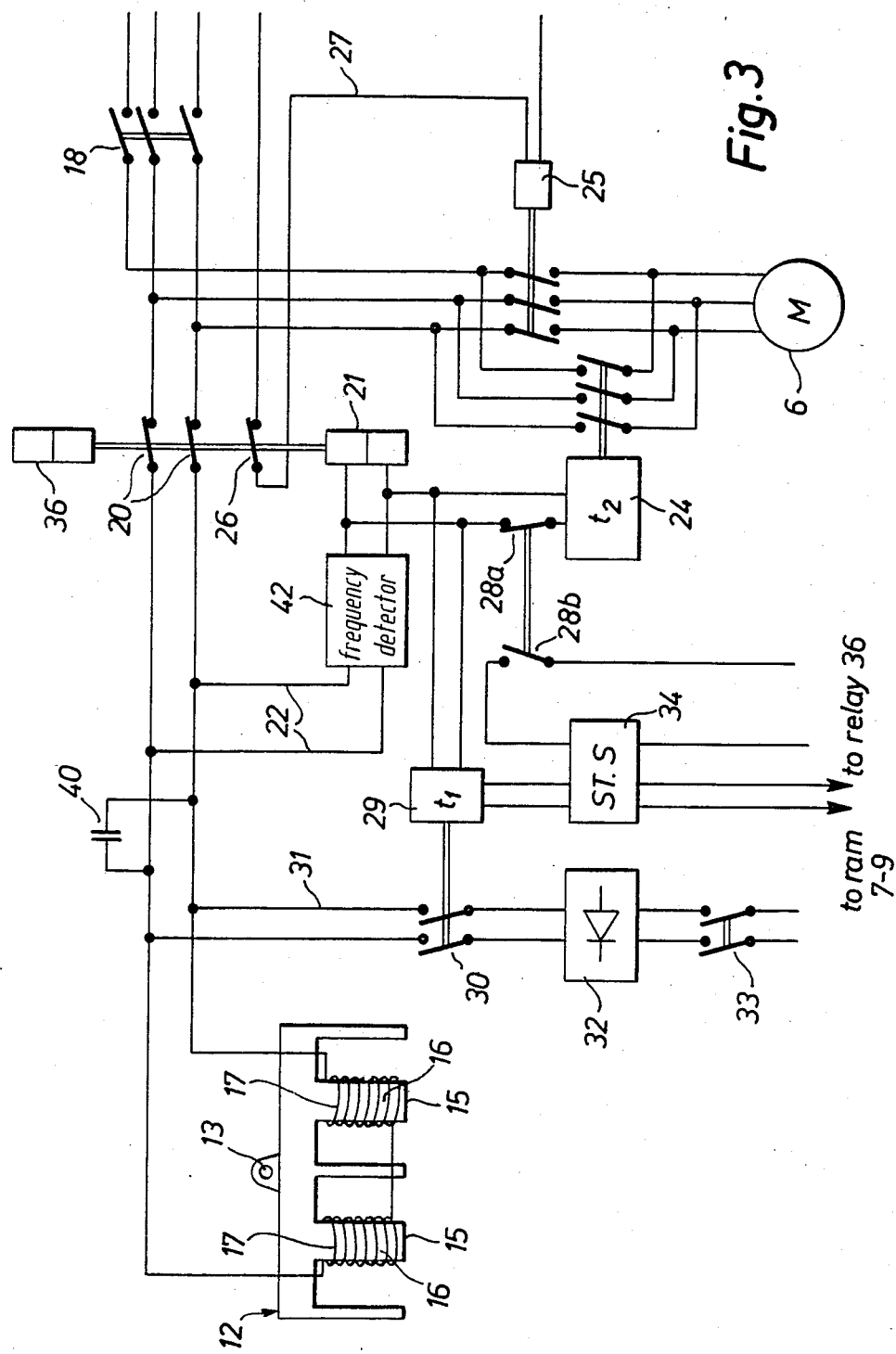
FIG. 3 is a diagram similar to FIG. 2, showing a resonant circuit as the signal producer.

Instead of the resistor 19, a capacitor 40 shown in FIG. 3 provides a resonant circuit for production of the control signal. As seen in FIG. 3, the capacitor 40 is connected to the A.C. power lines for the coils 17, to which the lines 22 are also connected. When the magnet carrier 4 is lowered, while switch contacts 20 are closed, the coils 17 form with capacitor an oscillation circuit producing pulses which are fed to a frequency detector 42 controlling operation of the relay 21, the timer 24 and the timer 29. Whether the holding magnets 12 are designed as A.C. magnets or otherwise the capacitor 40 may be connected in parallel with one, several or all of the windings 17. The capacitor 40 may be rated so as to form a resonant circuit tuned to the frequency of the supply system with the winding 17 when a workpiece 2 is in contact with the cores. Alternatively, the arrangement may be such that the capacitor 40 and the winding 17 have a resonant frequency deviating from the frequency of the supply system when the workpiece drops or has dropped down.

It shall be understood that the present invention is not limited to the embodiment shown by way of example and that deviations therefrom are possible within the scope of this invention. In particular, it shall be understood that individual features of this invention may be employed either separately or jointly in combination of a plurality of said features. Thus, each of the magnets may be provided with an arrangement as shown in FIG. 2. Alternatively, only some of the magnets may be designed in this fashion, and it is also possible to control a plurality of relays 21 via a amplifier 23 with a plurality of inputs. Furthermore, if the amppplifier 23 has only one input and only one of the electromagnets in accordance with FIG. 2 is connected, it is nevertheless possible to switch on all of the other electromagnets of the magnet carrier plate 4 if the amplifier 23 additionally controls a suitable two or three pole contactor for the windings 17 respectively.

What is claimed is:

1. Apparatus for automatically effecting the simultaneous transfer of a plurality of ferrometallic pieces from one-position contained in a bulk supply thereof to another position, remote therefrom comprising a carrier, and a transporter means selectively movable from a non-use position to a use position located between the carrier and the bulk supply for transferring pieces to a station, a reversible motor means for reciprocally moving said carrier between said one and another position, a supply of A.C. and D.C. electric power, a plurality of electromagnets disposed on said carrier, each of said electromagnets comprising a plurality of coil-wound poles, having first switch means for connecting the coils of at least one of said poles to said A.C. supply of electric power and second switch means for connecting the coils thereof to said D.C. supply of electrc power, said first switch means being normally closed and said second switch means being normally open, sensing means interposed between the associated coil of said at least one of said poles and said A.C. supply of electric power, said sensing means being responsive to variation in electrical power in said continually excited A.C. pole induced as a function of the change in magnetic flux ambient thereto to produce an electric control signal, and control means responsive directly to presence or absence of said control signal for operating said motor to move said carrier toward said workpieces into said one position and to cause said first switch means to open to disconnect said coils from said A.C. supply and to cause said second switch means to connect to said D.C. supply switch means to thereby excite said coil wound poles resulting in the attraction of a plurality of ferromagnetic pieces thereto, said control means including timing means operative by said electrical signal to thereafter actuate said motor to move said carrier from said one position to said another position, and to subsequently cause said second switch means to open removing the excitation of said remaining poles to cause the release of said ferrometallic pieces therefrom onto the transport means movable into the use position also in response to said switch means and to return said first switch means to its normally closed position and thereafter to actuate said motor to return said carrier from said another position to said one position to thereupon effect a repetition of movement of said carrier for the repetitive transfer of pieces from said bulk supply.

2. The apparatus according to claim 1, wherein said reversible motor comprises a motor connected to said supply of electrical power, a first relay having a normally closed contact interposed between said A.C. supply of electrical power and said motor and a first timing relay having a normally open contact interposed in parallel to said normally open contact between said supply of electrical power and said motor, first relay and said first timing relays being alternately actuable in response to the control signal to open and close the contact associated with said first relay and said first timing relays whereby on closing of the contact of the first relay said motor moves said carrier toward said one position and on closing of the contact of said first timing relay said motor moves said carrier toward said another position.

3. The apparatus according to claim 2, wherein said first timing relay includes an adjustable time delay retarding actuation thereof for a predetermined interval after actuation by said control signal.

4. The apparatus according to claim 3, including a limit switch having a normally closed contact operable when said carrier is in said another position to open and to cause said first time relay to open preventing passage of power to said motor.

5. The apparatus according to claim 4 wherein said normally open second switch means interposed between the coils and the D.C. supply of electrical power, includes a second timing relay activated by said control signal to delay closing of said second switch means until said motor has caused said carrier to stop in said one position and to maintain said second switch means closed during movement of said carrier into another position.

6. The apparatus according to claim 5 wherein said limit switch includes a second normally open contact, said open contact closing on activation of said limit switch and being operable to activate a stepping switch to recycle said apparatus.

7. The apparatus according to claim 6 wherein said stepping switch is operable to initiate conveyor means for removing said workpieces from said another position.

8. The apparatus according to claim 1, wherein said sensing means compriseses a low impedance resistor.

9. Apparatus according to any one of claims 1-7 wherein said sensing means comprises a capacitor bridging the source of A.C. electrical power forming a resonant circuit with said poles responsive to variation in the current or voltage therein induced as a function of the change in magnetic flux ambient thereto to produce a resonant frequency and including means responsive to a given frequency for producing an electric control signal.

* * * * *